United States Patent
Smith et al.

(10) Patent No.: US 12,185,752 B2
(45) Date of Patent: Jan. 7, 2025

(54) CASE FOR AEROSOL GENERATION DEVICE

(71) Applicant: RAI Strategic Holdings, Inc., Winston-Salem, NC (US)

(72) Inventors: Laura Smith, Winston-Salem, NC (US); Jared Aller, Winston-Salem, NC (US); Sean Lukan, Winston-Salem, NC (US); Rae McNeil, Winston-Salem, NC (US); Richard Woodard, Winston-Salem, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 653 days.

(21) Appl. No.: 17/380,611

(22) Filed: Jul. 20, 2021

(65) Prior Publication Data

US 2022/0022533 A1    Jan. 27, 2022

Related U.S. Application Data

(60) Provisional application No. 63/054,462, filed on Jul. 21, 2020.

(51) Int. Cl.
*A24F 15/01* (2020.01)
*A24F 7/00* (2006.01)
*A24F 40/95* (2020.01)

(52) U.S. Cl.
CPC ............... *A24F 15/01* (2020.01); *A24F 7/00* (2013.01); *A24F 40/95* (2020.01)

(58) Field of Classification Search
None
See application file for complete search history.

(56) References Cited

U.S. PATENT DOCUMENTS

| | | | | |
|---|---|---|---|---|
| 9,913,493 | B2* | 3/2018 | Worm | A61M 15/06 |
| 10,873,196 | B2* | 12/2020 | Gratton | H02J 7/007194 |
| 11,547,152 | B2* | 1/2023 | Schennum | A24F 40/95 |
| 2006/0243275 | A1 | 11/2006 | Ruckdeschel et al. | |

(Continued)

FOREIGN PATENT DOCUMENTS

CN    103179870 A    6/2013
CN    111050580 A    4/2020

(Continued)

OTHER PUBLICATIONS

International Search Report Written Opinion of International Application No. PCT/US2021/042564 dated Dec. 23, 2021, all pages cited in its entirety.

(Continued)

*Primary Examiner* — Ross N Gushi
(74) *Attorney, Agent, or Firm* — Burr & Forman LLP

(57) ABSTRACT

A case for an aerosol generation device may include a housing, a power module and a cap. The housing may include a sleeve portion configured to engage a portion of the aerosol generation device to retain the portion of the aerosol generation device in the housing. The power module may be disposed in the housing and configured to directly or indirectly provide power to the aerosol generation device. The cap may be operably coupled to the housing to cover a mouthpiece of the aerosol generation device in a closed state and enable access to the mouthpiece in an open state.

19 Claims, 7 Drawing Sheets

(56) References Cited

U.S. PATENT DOCUMENTS

| | | |
|---|---|---|
| 2009/0095311 A1 | 4/2009 | Han |
| 2014/0251326 A1 | 9/2014 | Terry et al. |
| 2015/0013696 A1 | 1/2015 | Plojoux et al. |
| 2022/0142263 A1* | 5/2022 | Cali .................. A24F 40/95 |

FOREIGN PATENT DOCUMENTS

| | | |
|---|---|---|
| KR | 101094727 B1 | 12/2011 |
| WO | 2020016184 A1 | 1/2020 |

OTHER PUBLICATIONS

Partial Supplementary European Search Report issued in corresponding European Patent Application No. 21845579.8 mailed Aug. 1, 2024, all pages cited in its entirety.

* cited by examiner

CASE FOR AEROSOL GENERATION DEVICE

TECHNICAL FIELD

Example embodiments generally relate to non-combustible aerosol provision systems and, in particular, relate to a reconfigurable case for use with a non-combustible aerosol provision device.

BACKGROUND

Non-combustible aerosol provision systems (e.g., e-cigarettes/tobacco heating products or other such devices) generally contain an aerosolisable material, such as a reservoir of a source liquid containing a formulation. The formulation typically includes nicotine, or a solid material such as a tobacco-based product, from which an aerosol is generated for inhalation by a user, for example through heat vaporization. However, devices including formulations with other materials, such as cannabinoids (e.g., Tetrahydrocannabinol (THC) and/or Cannabidiol (CBD)), botanicals, medicinals, caffeine, and/or other active ingredients, are also possible. Thus, a non-combustible aerosol provision system will typically include an aerosol generation chamber containing a vaporizer, e.g., a heater, arranged to vaporize a portion of the aerosolisable material to generate an aerosol in the aerosol generation chamber. As a user inhales on a mouthpiece of the device and electrical power is supplied to the heater, air is drawn into the device and into the aerosol generation chamber where the air mixes with the vaporized aerosolisable material and forms a condensation aerosol. There is a flow path between the aerosol generation chamber and an opening in the mouthpiece so the air drawn through the aerosol generation chamber continues along the flow path to an opening in the mouthpiece, carrying some of the condensation aerosol with it, and out through the opening in the mouthpiece for inhalation by the user.

Aerosol provision systems include, for example, vapor products, such as those delivering nicotine that are commonly known as "electronic cigarettes," "e-cigarettes" or electronic nicotine delivery systems (ENDS), as well as heat-not-burn products including tobacco heating products (THPs). Many of these products take the form of a system including a device and a consumable, and it is the consumable that includes the material from which the substance to be delivered originates. Typically, the device is reusable, and the consumable is single-use (although some consumables are refillable as in the case of so called "open" systems). Therefore, in many cases, the consumable is sold separately from the device, and often in a multipack. Moreover, subsystems and some individual components of devices or consumables may be sourced from specialist manufacturers.

Aerosol generation devices, like those described above, may be mass produced with form factor and function limitations determined by the manufacturer. However, some users may wish to alter the form and/or function of their own personal device.

BRIEF SUMMARY OF SOME EXAMPLES

In an example embodiment, a case for an aerosol generation device may be provided. The case may include a housing, a power module and a cap. The housing may include a sleeve portion configured to engage a portion of the aerosol generation device to retain the portion of the aerosol generation device in the housing. The power module may be disposed in the housing and configured to directly or indirectly provide power to the aerosol generation device. The cap may be operably coupled to the housing to cover a mouthpiece of the aerosol generation device in a closed state and enable access to the mouthpiece in an open state.

In another example embodiment, a reconfigurable case for an aerosol generation device may be provided. The reconfigurable case may include a housing, and a sleeve portion formed in the housing and configured to engage a portion of the aerosol generation device to retain the portion of the aerosol generation device in the housing. The housing may be configured to be reconfigurable to alter an aesthetic appearance of the reconfigurable case or functionality of the aerosol generation device responsive to operably coupling the reconfigurable case to the aerosol generation device.

It will be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 1 illustrates a general block diagram of a non-combustible aerosol provision system that may be used in connection with an example embodiment;

FIG. 2 illustrates a schematic representation of a partially cutaway view of an aerosol generation device that may be used in connection with an example embodiment;

DETAILED DESCRIPTION

Figure 3:
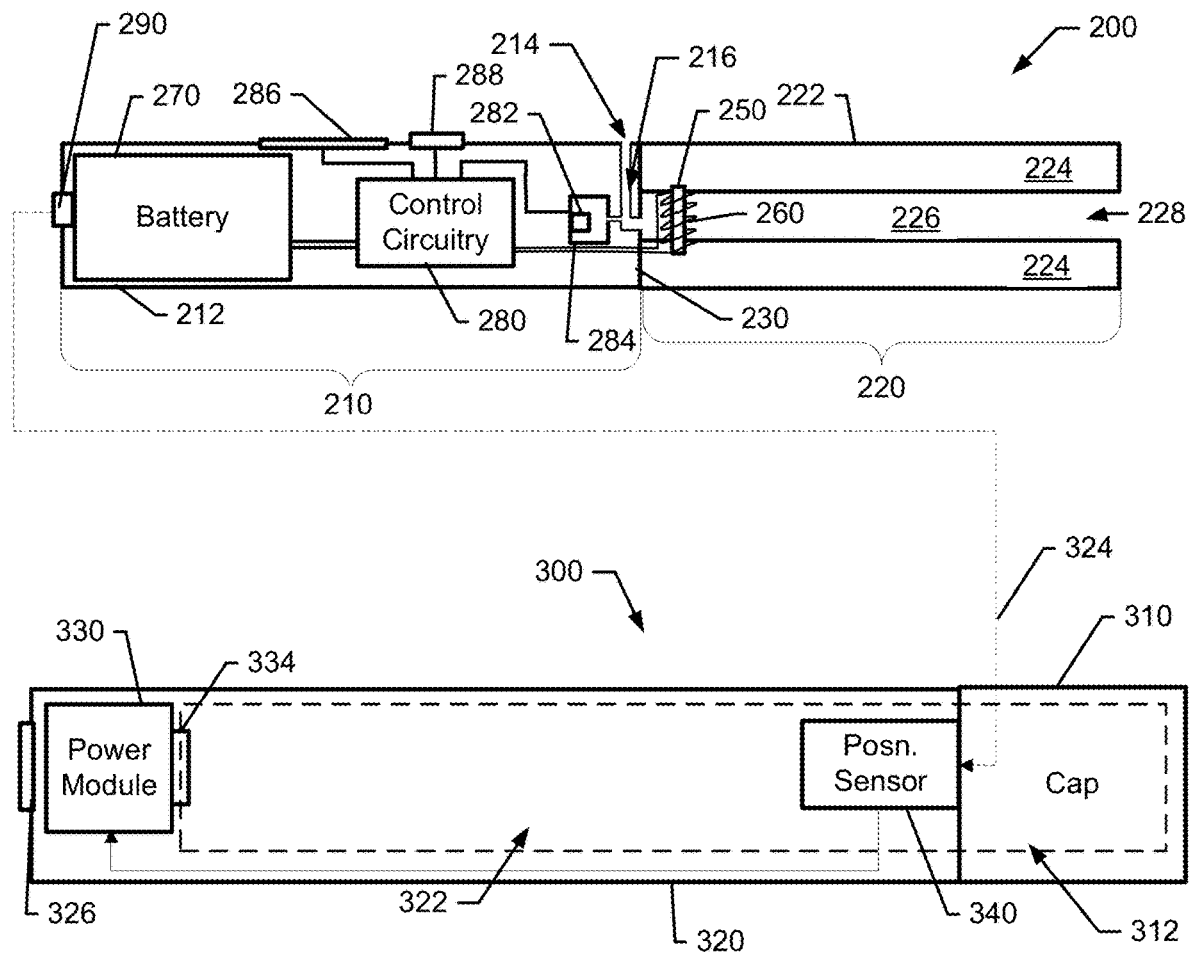
FIG. 3 is a schematic view of the device of FIG. 2 being operably coupled to a case for effectively reconfiguring the capabilities of the device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, non-combustible aerosol provision systems such as an ENDS device, may be produced with limited variations in form and/or function. In order to facilitate the ability of users to customize their own devices, in terms of form and/or function, some example embodiments may provide cases that may be configured to receive a device and add certain functions and/or aesthetic elements that may be customizable by the user. Such cases may give users freedom to improve or customize their devices without any need for device redesign or reconfiguration by the manufacturer. As such, for example, the costly process of evaluating design changes for marketability and/or compliance with regulatory regimes may be avoided, while still enabling users to satisfy their own respective desires for device improvement and/or customization.

Given that example embodiments may be employed in connection with upgrading and/or customizing of non-combustible aerosol provision systems such as ENDS devices, a general description of an example device will be provided since some aspects of the smart case described herein may be tailored to interface with such devices. In this regard, FIG. 1 illustrates a general block diagram of a non-combustible aerosol provision system that may be used in connection with an example embodiment. Meanwhile, FIG. 2 illustrates a schematic representation of a partially cutaway view of an aerosol generation device that may be used in connection with an example embodiment.

Referring first to FIG. 1, a non-combustible aerosol provision system 100 may include a housing 110 inside which a power source 120 and control circuitry 130 may be housed. The housing 110 may further include an aerosol production assembly 140 and an aerosol precursor container 150 inside which an aerosol precursor material (e.g., aerosolisable material) may be stored or contained. The housing 110 may be a single structure, or may be formed from two or more portions that are may be removable with respect to each other. For example, in an open system, the housing 110 may be a single structure with the aerosol precursor container 150 being refillable. However, for a closed system, the housing 110 may include at least one portion inside which the aerosol precursor container 150 is located, and when the aerosol precursor material is exhausted, the portion inside which the aerosol precursor container 150 is located may be removed for replacement with a new or full aerosol precursor container 150. In some examples with a removable portion inside which the aerosol precursor container 150 is located, the removable portion may be referred to as a cartridge.

The control circuitry 130 may be configured to detect or sense a puff event initiated by a user, and in response to detecting the puff event, the control circuitry 130 may actuate the aerosol production assembly 140 to transform the aerosol precursor material into an aerosol. The control circuitry 130 may therefore include a pressure sensor, a flow sensor, and/or any other suitable devices that can be configured to detect the puff event. A mouthpiece 152 defining an opening 154 in the housing 110 may be associated with the aerosol precursor container 150, and may be used by the user to initiate the puff event by inhaling at the mouthpiece 152. Accordingly, in response to the detection of the puff event, the aerosol may be produced by the aerosol production assembly 140 and delivered orally to the user via the mouthpiece 152.

The aerosol production assembly 140 may be configured to produce the aerosol from the aerosol precursor material using any suitable means. For example, the aerosol production assembly 140 may be embodied as a heat-not-burn device via which, for example, the aerosol is produced by exposing the aerosol precursor material to a heating element (e.g., an induction heater, conduction heater, dielectric heater, microwave heater, radiant heater, arc heater, electrical resistance heater, etc.). In such an example, the aerosol precursor material may be provided in a consumable that may be exposed to the aerosol production assembly 140 such that the heat thereof causes production of the aerosol from the aerosol precursor material. In some cases, the aerosol precursor material may include a substrate and/or a susceptor to facilitate the heating and aerosol release. Alternatively, in the case of a no-heat-no-burn device (e.g., nebulizer), the aerosol production assembly 140 may be embodied as or include a vibratable piezoelectric or piezomagnetic mesh. However, compressed gas, ultrasonic waves, surface acoustic waves, and other technologies may alternatively be employed. The nebulizer may be configured to break up the aerosol precursor material into an aerosol without heating the aerosol precursor material. In other words, heat generation may or may not be involved in the operation of the aerosol production assembly 140. Moreover, in some cases, the aerosol production assembly 140 may include a combination of elements, which can include both a heating element and an additional element, such as a vibrating aerosol production component (e.g., a vibratable piezoceramic and/or other piezoelectric or piezomagnetic material) that cooperate to produce aerosol from an aerosol precursor material. Hybrid products may also be used. In this regard, hybrid products use a combination of aerosol-generating materials, one or a plurality of which may be heated. Each of the aerosol-generating materials may be, for example, in the form of a solid, semi-solid, liquid, or gel. Some hybrid products are similar to vapor products except that the aerosol generated from a liquid or gel aerosol-generating material passes through a second material (such as tobacco) to pick up additional constituents before reaching the user. In some example implementations, the hybrid system includes a liquid or gel aerosol-generating material, and a solid aerosol-generating material. The solid aerosol-generating material may include, for example, tobacco or a non-tobacco product.

The aerosol precursor material may be a solid, semi-solid, or liquid material. As such, the aerosol precursor container 150 may be configured to retain the aerosol precursor material in whatever form such material may take. In some cases, the aerosol precursor container 150 may be a reservoir configured to store liquid that is operably coupled to the aerosol production assembly 140 (e.g., directly or indirectly) for the generation of the aerosol as described above. In some examples, the aerosol precursor material may be provided in a substrate (e.g., coated or absorbed on/in the substrate) such that the aerosol precursor material may be integrated in, stored in, or deposited on the substrate prior to being used for generation of the aerosol.

The power source 120 may be a replaceable or rechargeable battery. Rechargeable batteries may be useful to avoid or limit production of waste materials, and to facilitate ease of operation. To facilitate recharging of the power source 120, a charge interface 122 may be provided. The charge interface 122 may include a USB (Universal Serial Bus) port or other charge port into which a charger cord or other charging device may be plugged or inserted. The charge interface 122 may therefore form a penetration or opening in the housing 110.

FIG. 2 is a cross-sectional view through one example non-combustible aerosol provision device 200 that may be implemented in connection with an example embodiment. The non-combustible aerosol provision device 200 is one more detailed example of the non-combustible aerosol provision system 100 of FIG. 1, and both may be considered to be examples of aerosol generation devices. The non-combustible aerosol provision device 200 of FIG. 2 is a two-part device (i.e., a closed system), which includes a control unit 210 and a cartridge 220. The cartridge 220 may be referred to as a consumable part (or replaceable/disposable part) and the control unit 210 may be referred to as a reusable part.

In normal use the control unit 210 and the cartridge 220 may be releasably coupled together at a coupling interface 230. When the cartridge 220 is exhausted or the user simply wishes to switch to a different cartridge 220 (e.g., for a different flavor), the cartridge 220 may be removed from the control unit 210 and a replacement (i.e., a different or new instance of the cartridge 220) may be attached to the control unit 210 in place of the original cartridge 220. The coupling interface 230 may provide a structural, electrical and/or air path connection between the cartridge 220 and the control unit 210, and may be established in accordance with conventional techniques, which may include a screw thread, latch mechanism, or bayonet fixing with appropriately arranged electrical contacts and openings for establishing the electrical connection and air path between the cartridge 220 and the control unit 210 as appropriate. The specific manner by which the cartridge 220 mechanically mounts to the control unit 210 is not significant to the principles described herein, but for the sake of a concrete example is assumed here to comprise a latching mechanism, for example with a portion of the cartridge 220 being received in a corresponding receptacle in the control unit 210 with cooperating latch engaging elements. It will also be appreciated the coupling interface 230 in some implementations may not support an electrical connection between the respective parts. For example, in some implementations a vaporiser may be provided in the control unit 210 rather than in the cartridge 220.

The cartridge 220 may include a consumable housing 222 (e.g., as an example of the aerosol precursor container 150 of FIG. 1). The consumable housing 222 may be formed of a plastic, composite or metallic material. The consumable housing 222 may support other components of the cartridge 220 and provide support for a portion of the mechanical coupling interface 230 with the control unit 210. The consumable housing 222 in this example is generally circularly symmetric about a longitudinal axis along which the cartridge 220 couples to the control unit 210. The consumable housing 222 of this example may have a length of about 4 cm and a diameter of around 1.5 cm. However, it will be appreciated the specific geometry, and more generally the overall shapes and materials used, may be different in different implementations.

A reservoir 224 may be provided within the consumable housing 222 to contain liquid aerosolisable material (e.g., the aerosol precursor material of FIG. 1). The aerosolisable material may be referred to as e-liquid in some examples. The liquid reservoir 224 in this example has an annular shape, though it will be appreciated that other shapes are within the scope of the disclosure, with an outer wall defined by the consumable housing 222 and an inner wall that defines an air path 226 through the cartridge 220. The reservoir 224 is closed at each end with end walls to contain the e-liquid. The reservoir 224 may be formed in accordance with conventional techniques and may, for example, be formed of a plastic material integrally molded with the consumable housing 222. The opening of the air path 226 at the end of the cartridge 220 provides a mouthpiece outlet 228 for the non-combustible aerosol provision system through which a user inhales aerosol generated by the non-combustible aerosol provision device 200 during use.

The cartridge 220 of this example may further include a wick 250 and a heater element 260 (e.g., a vaporiser) located proximate to an end of the reservoir 224 opposite to the mouthpiece outlet 228. In this example the wick 250 extends transversely across the air path 226 with ends thereof extending into the reservoir 224 of e-liquid through openings in the inner wall of the reservoir 224. The openings in the inner wall of the reservoir 224 may be sized to broadly match the dimensions of the wick 250 to provide a reasonable seal against leakage from the reservoir 224 into the air path 226 without unduly compressing the wick 250, which may be detrimental to fluid transfer performance.

The wick 250 and heater element 260 may be arranged in the air path 226 of the cartridge 220 such that a region of the air path 226 around the wick 250 and heater element 260 in effect defines a vaporisation region for the cartridge 220. E-liquid in the reservoir 224 infiltrates the wick 250 through the ends of the wick 250 that extend into the reservoir 224 and is drawn along the wick 250 by surface tension/capillary action (i.e. wicking). The heater element 260 in this example may be embodied as an electrically resistive wire coiled around the wick 250. In this example, the wick 250 may be a glass fibre bundle, but other configurations are also possible. In use, electrical power may be supplied to the heater element 260 to vaporise an amount of e-liquid (e.g., aerosolisable material) drawn to the vicinity of the heater element 260 by the wick 250. Vaporised e-liquid may then become entrained in air drawn along the air path 226 from the vaporisation region to form a condensation aerosol that exits the system through the mouthpiece outlet 228 for user inhalation. Thus electrical power can be applied to the heater element 260 to selectively generate aerosol from the e-liquid in the cartridge 220. When the device is in use and generating aerosol, the amount of power supplied to the heater element 260 may be varied, for example through pulse width and/or frequency modulation techniques, to control the temperature and/or rate of aerosol generation as desired.

The control unit 210 may include an outer housing 212 (e.g., as a portion of the housing 110 of FIG. 1) with an opening that defines an air inlet 214 for the non-combustible aerosol provision device 200. The non-combustible aerosol provision device 200 may also include, within the outer housing 212, a battery 270 for providing operating power for the non-combustible aerosol provision device 200. The battery 270 may be operably coupled to control circuitry 280 configured for controlling and monitoring the operation of the non-combustible aerosol provision device 200. The battery 270 may be an example of the power source 120, and the control circuitry 280 may be an example of the control circuitry 130 of FIG. 1.

The control circuitry 280 may be operably coupled to an inhalation sensor 282 (e.g., puff detector), which in this example comprises a pressure sensor located in a pressure sensor chamber 284. The control circuitry 280 may also be operably coupled to a visual display 286 (which may be optional). The visual display 286 may include one or more lights configured to indicate various status conditions of the non-combustible aerosol provision device 200 based on light color, flash sequences, or other indications. Alternatively or additionally, the visual display 286 may be configured to display characters, images and/or the like via a liquid crystal display (LCD) screen, one or more light emitting diodes (LEDs) or other display options. Thus, the visual display 286 may be provided to give a user a visual indication of various characteristics associated with the non-combustible aerosol provision device 200. For example, the visual display 286 may provide information indicative of current power and/or temperature setting information, remaining battery power, and so forth. As an alternative (or in addition) to the visual display 286, some example embodiments may include other means for providing a user with information relating to operating characteristics of the non-combustible aerosol provision device 200 such as, for example, using audio signalling or haptic feedback.

The control circuitry 280 may be configured to monitor the output from the inhalation sensor 282 to determine when a user is inhaling through the mouthpiece opening 228 of the cartridge 220 so that power can be automatically supplied to the heating element 260 to generate aerosol in response to user inhalation. In other implementations, as an alternative to automatic operation of the heating element 260, a button 288 may be provided instead of the inhalation sensor 282, and power may be supplied to the heating element 260 in response to a user manually activating the button 288 to trigger aerosol generation. Thus, the button 288 may also be entirely optional and omitted in some cases.

The outer housing 212 may be formed, for example, from a plastic or metallic material and may be shaped to have any desirable profile. In some examples, the outer housing 212 may be substantially cylindrical and therefore have a circular cross-section generally conforming to the shape and size of the cartridge 220 so as to provide a smooth transition between the two parts at the coupling interface 230. In some examples, the control unit 210 may have a length of around 8 cm so the overall length of the non-combustible aerosol provision device 200 when the cartridge 220 and control unit 210 are operably coupled together is around 12 cm. However, and as already noted, it will be appreciated that the overall shape and scale of components may be changed in different example embodiments without altering the principles described herein.

The air inlet 216 connects to an air path 216 through the control unit 210. The air path 216 of the control unit 210 in turn connects to the air path 226 of the cartridge 220 across the coupling interface 230 when the control unit 210 and cartridge 220 are operably coupled together. The pressure sensor chamber 284 containing the pressure sensor 282 may be in fluid communication with the air path 216 in the control unit 210 (i.e. the pressure sensor chamber 284 branches off from the air path 216 in the control unit 210). Thus, when a user inhales on the mouthpiece opening 228, there is a drop in pressure in the pressure sensor chamber 284 that may be detected by the pressure sensor 282 and also air is drawn in through the air inlet 214, along the air path 216 of the control unit 210, across the coupling interface 230, through the aerosol generation region in the vicinity of the heating element 260 (where an aerosol generated from the aerosolisable material becomes entrained in the air flow when the heating element 260 is active), along the air path 226 of the cartridge 220, and out through the mouthpiece opening 228 for user inhalation.

The battery 270 in this example is rechargeable and may be recharged via charging connector 290. In this regard, the battery 270 may be recharged through an opening in the control unit outer housing 212 at which the charging connector 290 is formed, and to which a charging plug or other charging device may be operably coupled. The charging connector 290 may take any suitable configuration including, for example, a USB connector, other standard power connectors, or even proprietary charging connections.

The control circuitry 280 may be configured or programmed to control the operation of the non-combustible aerosol provision device 200 to provide various functions thereof. The control circuitry 280 may be considered to logically comprise various sub-units or circuitry elements associated with different aspects of the operation of the non-combustible aerosol provision device 200 in accordance with the principles described herein and other conventional operating aspects of non-combustible aerosol provision devices 200, such as display driving circuitry and user input detection. It will be appreciated the functionality of the control circuitry 280 can be provided in various different ways such as, for example, using one or more suitably programmed programmable computer(s) and/or one or more suitably configured application-specific integrated circuit(s)/circuitry/chip(s)/chipset(s) configured to provide the desired functionality.

In some cases, the non-combustible aerosol provision device 200 may have three basic operating states. However, additional or different operating states are also possible. The three basic operating states may include an "off" state, an "on" state, and a "standby" state. In the off state, the non-combustible aerosol provision device 200 may unable to generate aerosol (i.e. the control circuitry 280 may prevent supplying of power to the heating element 260 in the off state). The non-combustible aerosol provision device 200 may, for example, be placed in the off state between use sessions, for example, when the non-combustible aerosol provision device 200 might be set aside or placed in a user's pocket or bag. In the on (or active) state, the non-combustible aerosol provision device 200 may be enabled to actively generate aerosol (e.g., the control circuitry 280 may provide (or enable provision of) power to the heating element 260). The non-combustible aerosol provision device 200 will thus typically be in the on state when a user is in the process of inhaling aerosol from the non-combustible aerosol provision device 200. In the standby state the non-combustible aerosol provision system may be ready to generate aerosol (e.g., ready to apply power to the heater element 260 of the illustrated embodiment) in response to user activation, but may not currently be doing so. The non-combustible aerosol provision device 200 will typically be in the standby state when a user initially exits the off state to begin a session of use (e.g., when a user initially turns on the non-combustible aerosol provision device 200), or between uses during an ongoing session of use (e.g., between puffs when the user is using the non-combustible aerosol provision device 200). It is more common for examples of the non-combustible aerosol provision device 200 using liquid aerosolisable material to revert to the standby mode between puffs, whereas non-combustible aerosol provision devices 200 using solid aerosolisable material may more often remain on between puffs to seek to maintain the aerosolisable material at a desired temperature during a session of use comprising a series of puffs.

To generate an aerosol in the non-combustible aerosol provision device 200, electrical power from the battery 270 is supplied to the heater element 260 under control of the control circuitry 280. When the non-combustible aerosol provision device 200 is on, i.e. actively generating an aerosol, power may be supplied to the heater element 260 in a pulsed fashion, for example, using a pulse width modulation (PWM) scheme to control the level of power being delivered. Thus, the power supplied to the heater element 260 during a period of aerosol generation may comprise an alternating sequence of on periods during which power is connected to the electric heater and off periods during power is not connected to the heater element 260. The cycle period for the pulse width modulation (i.e. the duration of a neighbouring pair of an off and an on period) is in this example 0.020 s (20 ms) (i.e. the pulse width modulation frequency is 50 hertz). The proportion of each cycle period during which power is being supplied to the heater (i.e. the length of the on period) as a fraction of the cycle period is the so-called duty cycle for the pulse width modulation. In accordance with certain embodiments of the disclosure, the control circuitry of the non-combustible aerosol provision system may be configured to adjust the duty cycle for the pulse width modulation to vary the power supplied to the heater, for example to achieve a target level of average power or to achieve a target temperature.

As noted above, in order to avoid changes to the designs of aerosol generation devices themselves, it may be possible (and perhaps even desirable) to provide ways to improve the functionality and/or appearance of the devices via other methods. Some example embodiments may address this issue by providing a case that is reconfigurable in terms of either or both of aesthetic appearance and functional capabilities. The reconfigurable case may be provided to fully or partially enclose the aerosol generation device and add or improve certain functional capabilities to the aerosol generation device. The case may also or alternatively enable the user to change the look or aesthetic appearance of the case of the aerosol generation device. An example reconfigurable case is shown and will be described in reference to FIG. 3.

In an example embodiment, a reconfigurable case 300 may be configured specifically for connection to the non-combustible aerosol provision device 200 in order to retain a sleek and appealing, and also user-selectable, appearance. However, the reconfigurable case 300 may further or alternatively be configured to provide additional functionality that enables enhanced charging and/or sanitation of the non-combustible aerosol provision device 200. As such, when connected together, the combination of the non-combustible aerosol provision device 200 and the reconfigurable case 300 may form an aesthetically and/or functionally improved or changed version of the non-combustible aerosol provision device 200 without otherwise conducting design changes thereof.

In some example embodiments, the reconfigurable case 300 may include a cap 310 and a housing 320 that is configured to receive and mate with or otherwise interface with the non-combustible aerosol provision device 200 in a way that securely attaches the respective devices together. In this regard, in some cases, the attachable accessory 300 may be constructed to include a sleeve portion 322 formed in the housing 320. The sleeve portion 322 may have an internal diameter and/or shape that is configured to substantially match an external diameter and/or shape of the control unit 210 (or another portion of the non-combustible aerosol provision device 200). In particular, a distal end of the control unit 210 (relative to the cartridge 220) may be configured to slide into and be received inside the sleeve portion 322 as shown by arrow 324 in FIG. 3. A diameter (or other cross sectional measurement for different shaped sleeves) of the sleeve portion 322 may taper slightly as it proceeds inwardly into the housing 320 such that the control unit 210 and the sleeve portion 322 may stay in contact with each other by friction responsive to insertion of the control unit 210 into the sleeve portion 322. However, in alternative embodiments, other fixing methods (including latching mechanisms, catch members, complementary ridges/grooves, magnetic coupling and/or the like) may be employed. For example, the outer housing 212 of the control unit 210 may be metallic, or have a metallic portion or magnet thereon, and the sleeve portion 322 may include a magnet disposed to engage the control unit 210 (or the magnet or magnetic portion of the outer housing 212 of the control unit 210).

The housing 320 and sleeve portion 322 may be configured to leave any desirable portions of the control unit 210 and/or the cartridge 220 exposed. In some cases, the housing 320 and the sleeve portion 322 may leave only at least a portion of the cartridge 220 exposed. Moreover, in some cases, only a mouthpiece of the cartridge 220 may remain exposed. By leaving the cartridge 220 (or at least a portion thereof) exposed (i.e., not surrounded by the sleeve portion 322), the cartridge 220 may be replaceable without removing the control unit 210 from the sleeve portion 322. Additionally or alternatively, the exposure of a mouthpiece portion of the cartridge 220 may permit use of the non-combustible aerosol provision device 200 even while inside the reconfigurable case 300. Thus, for example, the sleeve portion 322 may extend along the control unit 210 as far as the coupling interface 230 (although the sleeve portion 322 may extend past the coupling interface 230, or not as far as the coupling interface 230 in alternative embodiments). Moreover, to the extent the visual display 286 and/or button 288 are included on the control unit 210, the sleeve portion 322 and the housing 320 may be configured to leave both the visual display 286 and/or button 288 exposed, or include a window or operable member through which the visual display 286 may be viewed and/or the button 288 may be operated. Accordingly, the reconfigurable case 300 may be attached to the control unit 210 without negatively inhibiting the functionality of the non-combustible aerosol provision device 200 in any way.

The cap 310 may be removable or repositionable relative to the housing 320. In an example embodiment, at least the mouthpiece of the cartridge 220 (and in some cases all exposed portions of the cartridge 220 and perhaps also portions of the control unit 210) may be covered by the cap 310 when the cap 310 is in a closed state. Meanwhile, when the cap 310 is in an open state (or open position), the cap 310 may be either removed or at least repositioned such that the mouthpiece of the cartridge 220 is exposed. Thus, the cap 310 may include a hollow portion 312 inside which the mouthpiece of the cartridge 220 (and sometimes all of the cartridge 220) may fit when the cap 310 is in the closed state (or closed position).

When the cap 310 is in the closed state, the non-combustible aerosol provision device 200 may be fully enclosed within the reconfigurable case 300. Moreover, the cap 310 may be retained on the housing 320 when the cap 310 is in the closed state either via a friction fitting, a latch mechanism or another retention strategy. For example, the cap 310 and/or the housing 320 may include complementary ridges and grooves to retain the cap 310 on the housing 320 in the closed state. Alternatively, the cap 310 may be held on the housing 320 via a hinge structure as described in greater detail below. The cap 310 may either be fully removed, or may be repositioned to expose the mouthpiece of the cartridge 220 to enable usage of the non-combustible aerosol provision device 200 by the user sucking or inhaling at the mouthpiece of the cartridge 220. Accordingly, when the cap 310 is in the closed state, the mouthpiece of the cartridge 220 may be covered and protected from incursions by dust, debris, germs, etc. As such, the cap 310 may facilitate keeping a protected and sanitary mouthpiece until shifted to the open state for usage of the non-combustible aerosol provision device 200.

As noted above, the battery 270 of the control unit 210 may be charged via the charging connector 290. Accordingly, in some situations, the housing 320 may have an opening 326 disposed at a distal end (though it will be appreciated that opening 326 may be disposed in an alternative region of the housing in embodiments in which the charging connector 290 is disposed in an alternate location of the control unit 210) of the housing 320 (relative to the cap 310) to align with the charging connector 290. The opening 326 may enable air to enter into the sleeve portion 322 (e.g., to allow the air to also enter the air inlet 214 of the control unit 210). The opening 326 may also enable a charger or charging device to interface with the charging connector 290 (either directly or indirectly). Although, direct charging of the battery 270 may be possible via the opening 326, in some cases, the opening 326 may instead interface directly with a power module 330. The power module 330 may serve as a backup, reserve, or augmented power source for the battery 270. Thus, for example, the power module 330 may be a rechargeable or replaceable battery. Moreover, in some cases, the power module 330 may be a Lithium ion battery or other battery that can provide significant power in a relatively small form factor. By providing the power module 330 as a separate power source relative to the battery 270 of the non-combustible aerosol provision device 200, the non-combustible aerosol provision device 200 may be recharged or have enhanced operability between charges due to the extended power provided by the power module 330.

Accordingly, for example, the power module 330 may be separate from the battery 270 (i.e., two respective separate battery packs or cells), and the power module 330 may provide an alternate source of power to the non-combustible aerosol provision device 200, or a source of charging power for the battery 270. In some cases, both the battery 270 and the power module 330 could be separately (and possibly even simultaneously) charged via the charging connector 290 and the opening 326, via the power module 330. In such a case, the opening 326 may be configured itself as a charge port.

In some examples, the power module 330 may power the non-combustible aerosol provision device 200 either directly or indirectly. In this regard, for direct powering, the power module 330 may provide power to the control circuitry 280 when the battery 270 is either dead or below a threshold level of charge. For indirect powering, the power module 330 may be configured to interface with the battery 270 to charge the battery 270. For example, the power module 330 may include a charging interface 334 configured to mate with the charging connector 290 of the control unit 210 when the control unit 210 is inserted into the sleeve portion 322. When the charging interface 334 is mated with the charging connector 290, the power module 330 may be operably coupled to the battery 270 to enable the battery 270 to be charged from the power module 330. Thus, for example, the power module 330 may be configured to supply a higher voltage than the battery 270 so that, when operably coupled to each other, the battery 270 may be charged.

In such an example, the control circuitry 280 operation may be unimpeded in that the control circuitry 280 may still only supply power to the heater element 260 responsive to detecting the puff event, and the power may be still supplied from the battery 270. However, the battery 270 could be charged either simultaneously or at other (i.e., non-operational) times for the heater element 260. Thus, in some cases, charging from the power module 330 to the battery 270 may only be possible when the non-combustible aerosol provision device 200 is not operating. In some cases, the power module 330 may only charge the battery 270 when the non-combustible aerosol provision device 200 in the off state. In other cases, charging from the power module 330 to the battery 270 may only be possible when the non-combustible aerosol provision device 200 is in the off state or the standby state. However, it is also possible, as noted above, for charging during the on state in some cases. In some cases, the power module 330 may be configured to receive information indicative of the state of the non-combustible aerosol provision device 200, and control charging of the battery 270 (or provision of power directly to the control circuitry 280) based on the information received. Thus, for example, charging could be stopped when the non-combustible aerosol provision device 200 is active and/or in the standby status.

In some examples, the ability to charge the battery 270 may be inhibited based on the position of the cap 310. For example, when the cap 310 is in the closed state (indicating that the non-combustible aerosol provision device 200 is in the off state), the battery 270 may be charged via the power module 330. However, when the cap is in the open state (indicating that the non-combustible aerosol provision device 200 is either idle or operating), the battery 270 may not be charged via the power module 330. To facilitate control of charging based on position of the cap 310, the reconfigurable case 300 may include a position sensor 340 configured to detect the state of the cap 310. The position sensor 340 may be one example of position detection circuitry that may be used to detect the state of the cap 310. Although such circuitry may include sensors (e.g., Hall effect sensors, magnetic sensors, optical sensors (e.g., measuring changes in light levels based on cap position), etc.), the position detection circuitry could also or alternatively include other devices (e.g., switches, contacts, electrical circuits made or broken when the cap 310 is closed). The position sensor 340 of this example may communicate the detected state of the cap 310 (i.e., closed state or open state) to the power module 330 (or to the control circuitry 280), and charging contacts enabling charging of the battery 270 from the power module 330 may be closed when the cap 310 is in the closed state, and opened when the cap 310 is in the open state.

Charging may also or alternatively be controlled based on detection of a puff from the user. For example, the position sensor 340 may be replaced by or otherwise further include a puff sensor, or other pressure/airflow sensor that is configured to detect airflow, pressure change, etc., which may correspond to a puff event (e.g., based on pressure drop and/or flow of air through the cap 310 and/or housing 320) and disable charging during the puff event. As such, the position sensor 340 may represent the puff sensor when the puff sensor replaces the position sensor 340, or the position sensor 340 may alternatively include the puff sensor. Charge interruption based on puff detection may provide an alternative way for the reconfigurable case 300 to detect the use state in addition to or in lieu of the sensing of the position of the cap 310 by the position sensor 340.

Figure 4:
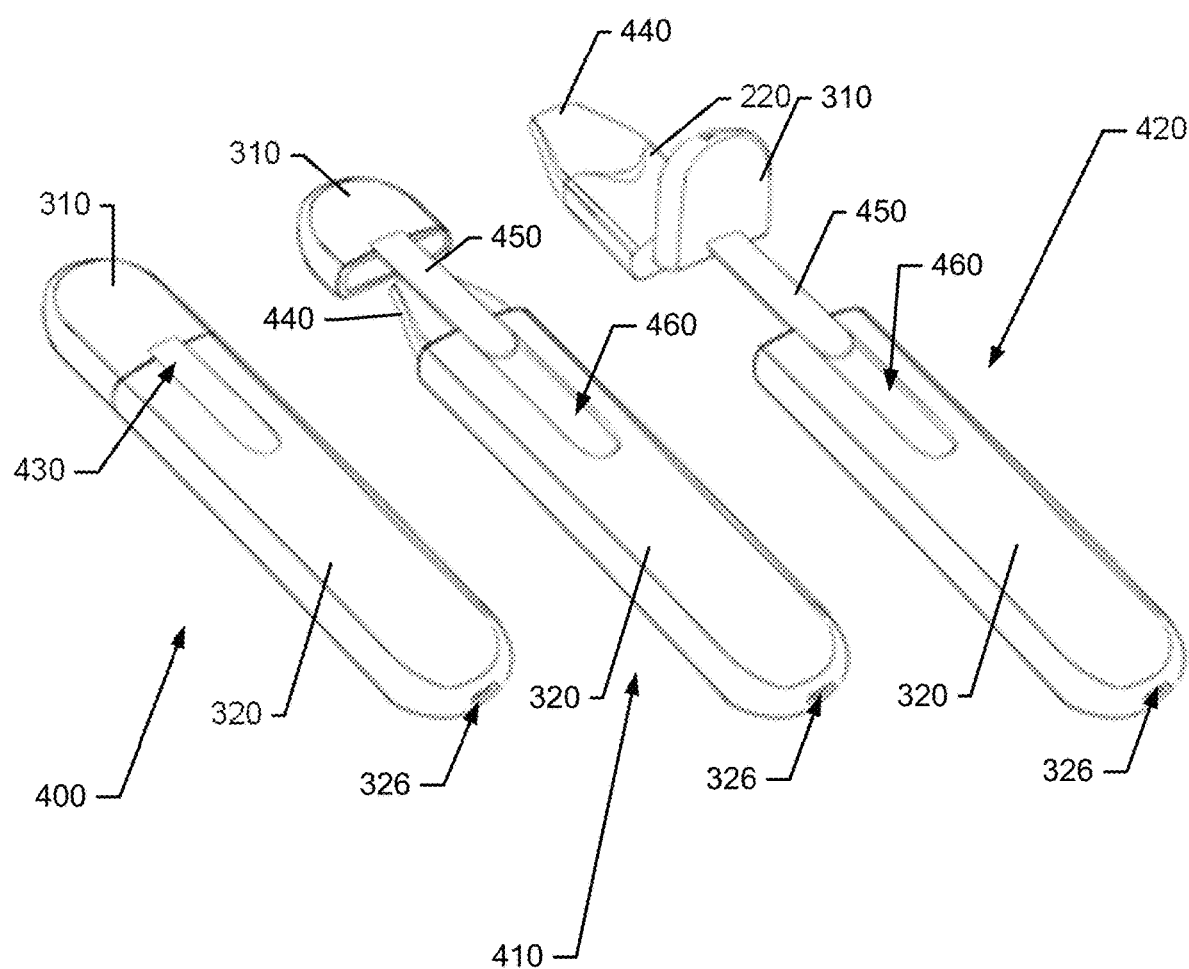
FIG. 4 illustrates specific form factors that may be employed in accordance with an example embodiment.

Accordingly, as can be appreciated from the example of FIG. 3, the reconfigurable case 300 may be reconfigurable to provide battery 270 charging or augmentation, and to provide an ability to protect or otherwise maintain cleanliness of the mouthpiece of the cartridge 220. FIG. 4 illustrates an example implementation for the reconfigurable case 300 of FIG. 3. In this regard, the reconfigurable case 300 is shown in a closed state 400, in a transitional state 410 and in an open state 420. In the closed state 400, the housing 320 and the cap 310 are in contact with each other and a cap positioning assembly 430 of the reconfigurable case 300 is also in a closed state in which the cap 310 entirely covers an conceals a mouthpiece 440 of the cartridge 220.

Referring to the transitional state 410, it can be appreciated that the cap positioning assembly 430 may include a guide bar 450, a guide slot 460, and a hinge 470. The guide bar 450 may be configured to slidably engage the guide slot 460 and therefore slide within the guide slot 460 to enable the cap 310 to be moved apart from the housing 320 due to motion of the guide bar 450 within the guide slot 460 in a direction away from the housing 320. As the guide bar 450 slides in the guide slot 460 away from the housing 320, the cap 310 may also be carried away from the housing 320 to expose the mouthpiece 440. The hinge 470 may be configured to be non-operational (i.e., unable to fold) unless the cap 310 is separated from the housing 320 as shown in the transitional state 410.

When in the transitional state 410, the cap 310 may be clear of the housing 320 by sufficient distance to enable the cap 310 to be rotated or tilted by operation of the hinge 470 to the open state 420. In some cases, when the hinge 470 is operated to rotate the cap 310, the cap 310 may be out of the way of the cartridge 220 to enable removal of the cartridge 220 as shown in the open state 420 of FIG. 4. One or more switches, contacts, sensors, position detection circuitry or the like may be positioned at one or more locations on the housing 320, the cap 310 and/or the cap positioning assembly 430 to act as the position sensor 340 of FIG. 3. For example, one or more sensors may detect the position of the hinge 470 to determine when the cap 310 is rotated to the open state. Alternatively, one or more sensors may detect a position of the guide bar 450 in the guide slot 460. As an example, the position sensor 340 may detect any movement of the guide bar 450 in the guide slot 460 away from the housing 320 as the transitional state or the open state in which case charging of the battery 270 may be prevented. Similarly, any movement of the cap 310 away from the housing 320 or rotation of the cap 310 may be detected and may disable charging of the battery 270 as described above. Thus, for example, charging of the battery 270 (e.g., from the power module 330 or any other source) may be prevented, unless the cap 310 can be determined to be in the closed state 400.

Figure 5:
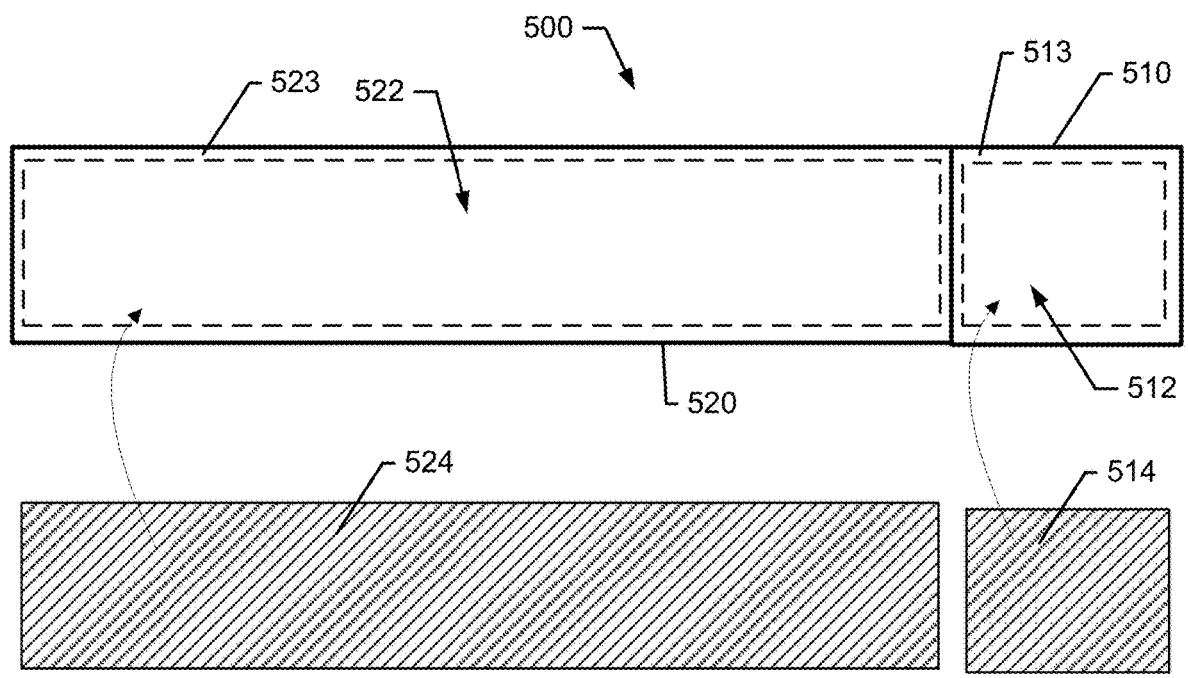
FIG. 5 illustrates a block diagram of another reconfigurable case in accordance with an example embodiment.

As noted above, reconfigurability may also be provided in terms of aesthetics instead of function. FIG. 5 illustrates a block diagram of a reconfigurable case 500 that includes this type of reconfigurability instead of the functional reconfigurability described above. The reconfigurable case of FIG. 5 also includes a cap 510 and housing 520, which may be the same or similar to the cap 310 and housing 320 described above in terms of operation and purpose. However, the cap 510 may include a receptacle 512 and/or the housing 520 may include a receptacle 522. The receptacles 512 and 522 may be recessed portions formed in or relative to a surface 513 of the cap 510 and a surface 523 of the housing 520, respectively, that are configured to receive respective inserts 514 and 524.

The inserts 514 and 524 may include colors, designs, logos, words/phrases, etc., which may personalize or otherwise change the aesthetic appearance of the reconfigurable case 500. In some cases, the receptacles 512 and 522 (and corresponding inserts 514 and 524) may only be on one side of the reconfigurable case 500. In such cases, the receptacles 512 and 522 may be provided on one of the sides that presents the largest amount of surface area on the outside of the cap 510 and housing 520. However, in other examples, multiple instances of the receptacles 512 and 522 may be provided on opposing sides of the cap 510 and housing 520 (i.e., the opposing sides having the largest amount of surface area on the outside of the cap 510 and housing 520). In still other examples, thin receptacles and correspondingly shaped inserts may also be provided on the sides with small amounts of surface area.

Figure 6:
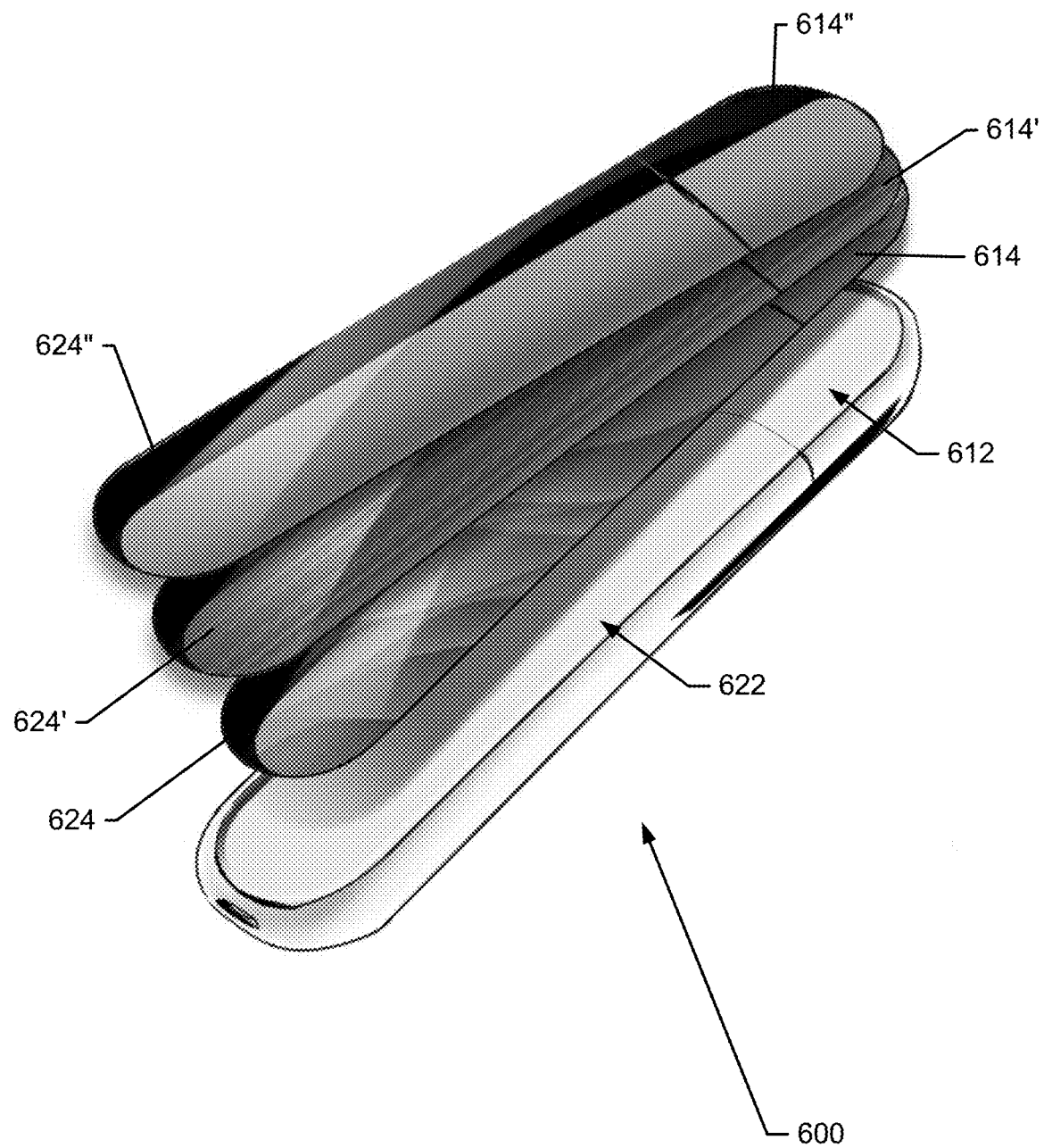
FIG. 6 illustrates an example of a reconfigurable case and inserts that can be provided therewith in accordance with an example embodiment.

Although FIG. 5 illustrates only one instance of each of the inserts 514 and 524, it should be appreciated that numerous instances of either or both may be provided in some examples. FIG. 6 illustrates an example showing a physical expression of a reconfigurable case 600 according to an example embodiment that employs multiple instances of inserts. In this regard, the reconfigurable case 600 is an example of the reconfigurable case 500 except that the reconfigurable case 600 has multiple different optional and interchangeable inserts. In this regard, inserts 614 and 624 are each shown along with other optional inserts 614', 614", 624' and 624", which represent different colors or designs of each respective instance of insert. The inserts 614 and 624 may snap fit into the respective receptacles 612 and 622. However, other means of retention (e.g., magnetism, adhesives, etc.) may be employed in other embodiments. As such, the inserts 614 and 624 (along with their other optional inserts 614', 614", 624' and 624") may act as reconfigurable skins or changeable design elements that the user can alter depending on his/her changing mood or desires. Sports teams, words of wisdom, names, or other expressions may also or alternatively be includes on the inserts.

It should also be appreciated that some embodiments may combine the features of FIG. 3 with the features of FIG. 5 to provide a reconfigurable case having both functional and aesthetic improvements implemented therein. Thus, for example, the reconfigurable case 500 may include any or all of the opening 326, the power module 330, the charging interface 334, and the position sensor 340 interfacing with the housing 520 and cap 510 in the same manner described above in reference to interfacing with the housing 320 and cap 310 of FIG. 3. As such, a reconfigurable case (cap and/or housing) of example embodiments may be customizable by the user with fashionable inserts to change textures, finishes, patterns, colors, branding, etc. of the appearance of the reconfigurable case. Meanwhile, the reconfigurable case may also have extended battery life, and a cap to keep the mouthpiece clean. Further functional and/or aesthetic improvements may also be added to, or substituted for, those discussed above. For example, an attachment clip may be added to the reconfigurable case, as shown in FIG. 7.

FIG. 7, which is defined by FIGS. 7A, 7B, 7C, 7D and 7E, shows various illustrations of another example instance of a reconfigurable case 700. In this regard, the reconfigurable case 700 includes an attachment clip 710 provided on an exterior surface 712 thereof. Of note, the reconfigurable case 700 of FIG. 7 is shown without any cap. However, it should be appreciated that a cap could also be included as described above. The reconfigurable case 700 of this example may otherwise be functionally (and structurally) identical to the reconfigurable case 300 of FIG. 3 with the exception (in this example only) of the cap and components/functions associated therewith. Thus, the reconfigurable case 700 may include a housing 720, which may include a sleeve portion configured to retain the non-combustible aerosol provision device 200 as described above in reference to FIG. 3. The reconfigurable case 700 may also include a power module (e.g., similar to power module 330) and therefore also include an opening 726 that is similar to the opening 326 of FIG. 3 in form and function. The opening 726 may enable a charger or charging device (e.g., a stand, plug, cord, etc.) to interface with the charging connector 290 (either directly or indirectly) of the non-combustible aerosol provision device 200 to provide a source for charging the battery 270 of the non-combustible aerosol provision device 200 directly or via the power module.

Figure 7A:
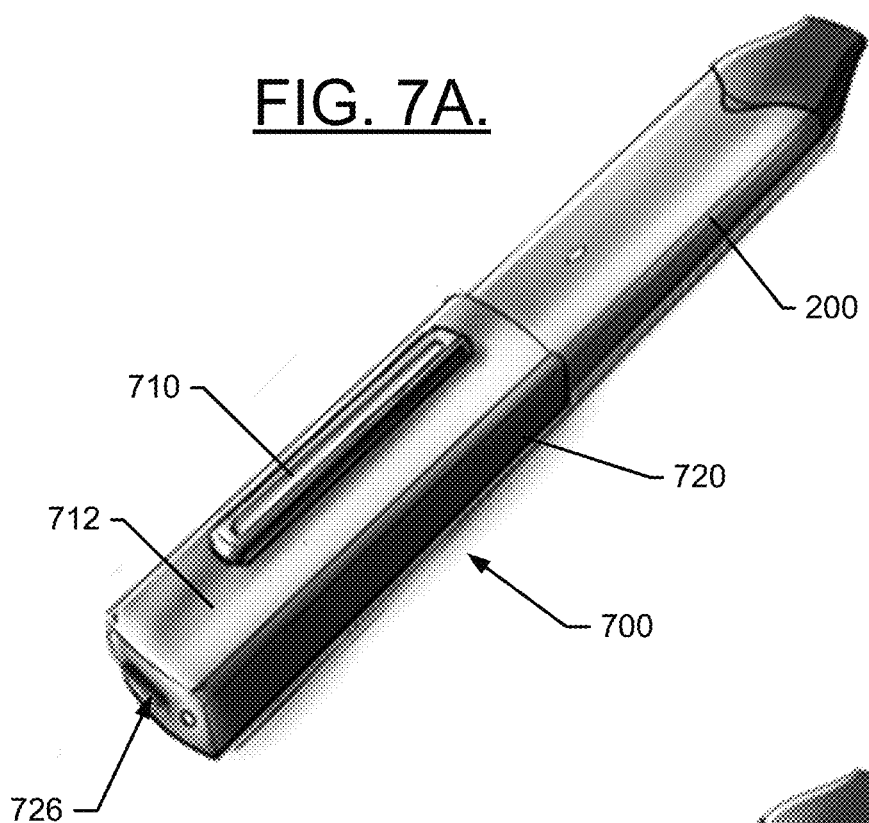
FIG. 7, which is defined by FIGS. 7A, 7B, 7C, 7D and 7E, illustrates a reconfigurable case with an adjustable attachment in accordance with an example embodiment.
Figure 7B:
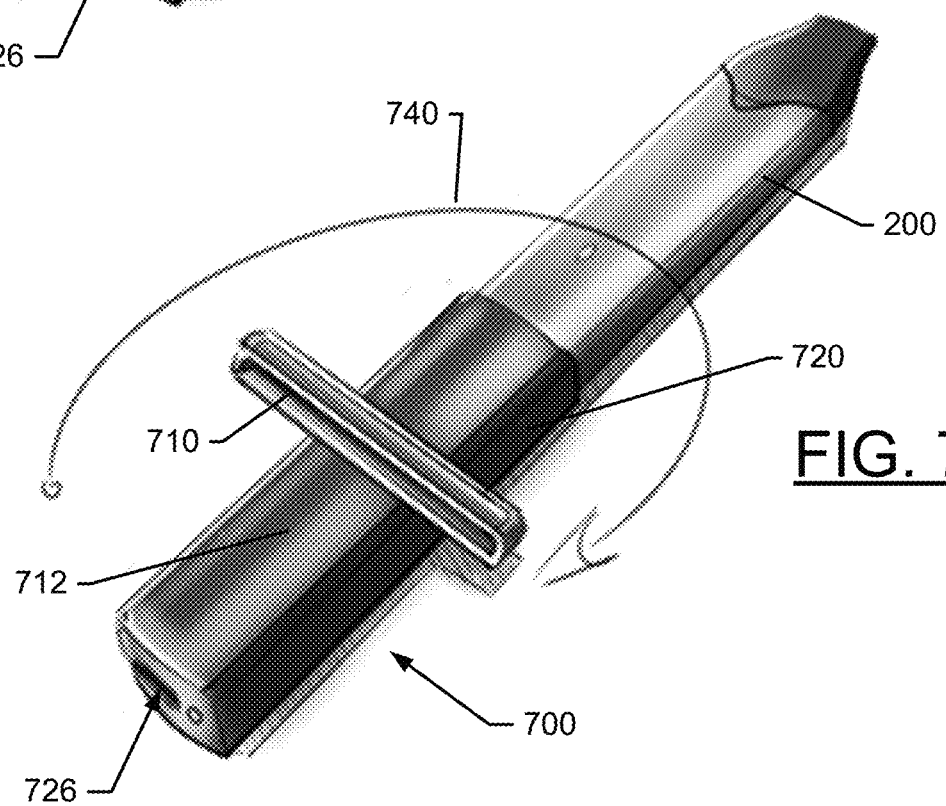

As shown in FIGS. 7A and 7B, the reconfigurable case 700 may also include the attachment clip 710, which may be operably coupled to the exterior surface 712 of the housing 720. In FIG. 7A, the attachment clip 710 is shown in alignment with a longitudinal centerline of each of the reconfigurable case 700 and the non-combustible aerosol provision device 200. However, as shown in FIG. 7B, the attachment clip 710 may be rotated (as shown by arrow 740) to various different alignments or positions relative to the longitudinal centerline of each of the reconfigurable case 700 and the non-combustible aerosol provision device 200. In this regard, FIG. 7B illustrates the attachment clip 710 rotated to be substantially perpendicular to the longitudinal centerline of each of the reconfigurable case 700 and the non-combustible aerosol provision device 200. However, it should be appreciated that the attachment clip 710 could be rotated to any other position between being parallel (or aligned with) the longitudinal centerline of each of the reconfigurable case 700 and the non-combustible aerosol provision device 200 and being perpendicular thereto. As such, the attachment clip 710 may be infinitely adjustable to positions that suit attachment of the reconfigurable case 700 to a number of different devices, structures, clothing articles, accessories, etc.

Figure 7C:
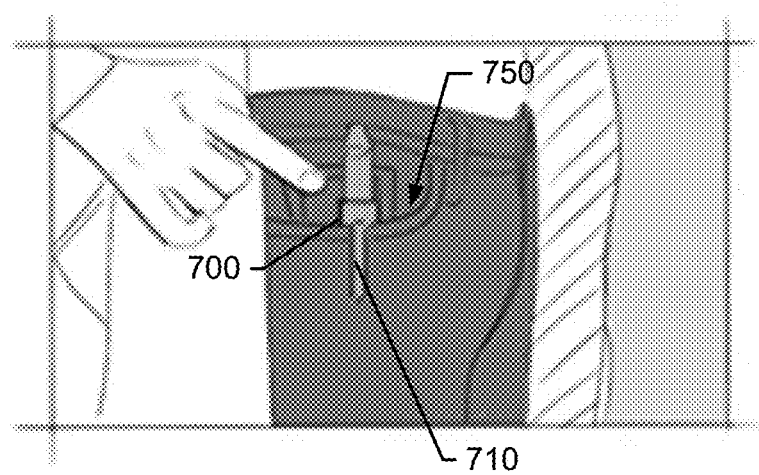
Figure 7D:
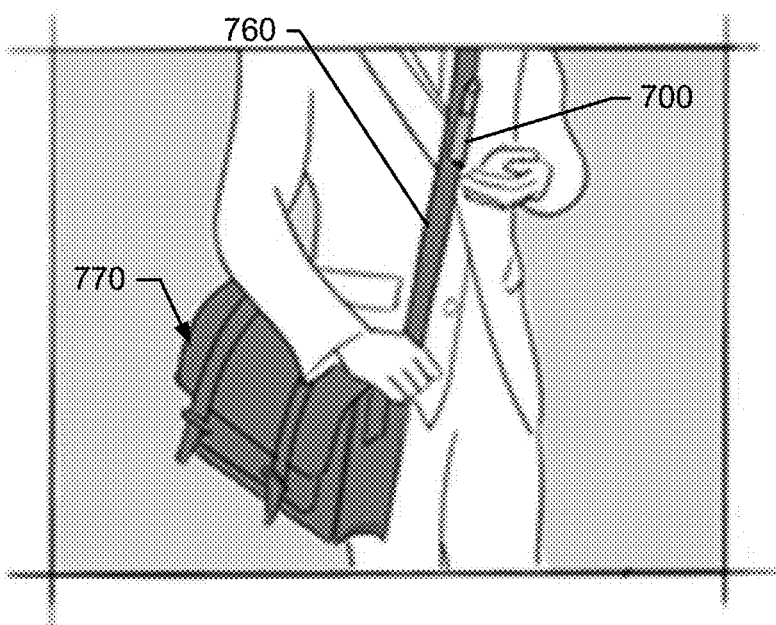
Figure 7E:
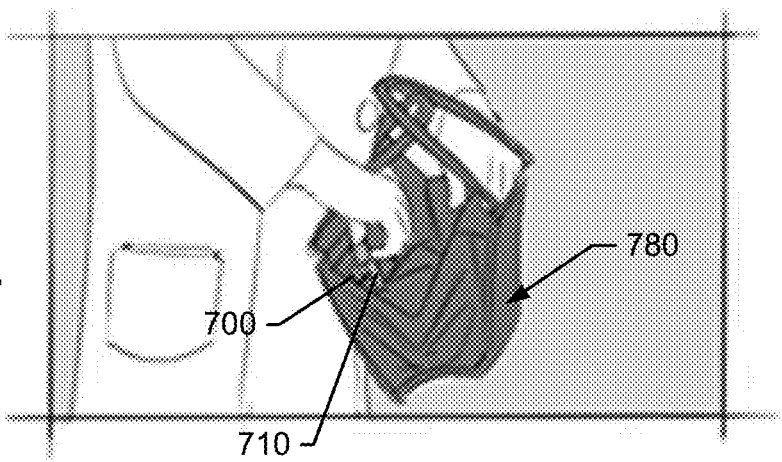

FIGS. 7C, 7D and 7E illustrate the reconfigurable case attached in numerous different contexts in order to show the flexibility provided by the attachment clip 710 for enabling the user to provide a convenient and temporary storage position for the reconfigurable case 700. As noted above, the user may charge the battery 270 of the non-combustible aerosol provision device 200, but also have convenient access to usage of the non-combustible aerosol provision device 200 based on attachment of the reconfigurable case 700 to objects via the attachment clip 710. In this regard, FIG. 7C shows the reconfigurable case 700 attached to a pocket 750 of a clothing article. Meanwhile, FIG. 7D illustrates the reconfigurable case 700 attached to a strap 760 of an accessory 770 (e.g., a satchel), and FIG. 7E illustrates the reconfigurable case 700 attached to a pocket of an accessory 780 (e.g., a purse). In all cases, and in other examples not pictured, the flexibility of the attachment clip 710 for rotation and re-orientation may allow the reconfigurable case 700 to be placed in the most desirable orientation for ease of access by the user.

Accordingly, as can be appreciated from the examples above, a reconfigurable (e.g., in aesthetics and/or function) case for an aerosol generation device may be provided in accordance with an example embodiment. The case may include a housing, a power module and a cap. The housing may include a sleeve portion configured to receive a portion of the aerosol generation device to retain the portion of the aerosol generation device in the housing. The power module may be disposed in the housing and configured to directly or indirectly provide power to the aerosol generation device. The cap may be operably coupled to the housing to cover a mouthpiece of the aerosol generation device in a closed state and enable access to the mouthpiece in an open state.

The case may include a number of modifications, augmentations, or optional additions, some of which are described herein. The modifications, augmentations or optional additions listed below may be added in any desirable combination. Within this context, the case described above may be considered a first embodiment, and other embodiments may be defined by each respective combination of modifications, augmentations or optional additions. For example, a second embodiment may be defined in which the power module may be configured to enable provision of power to the aerosol generation device when the cap is in the closed state, and prevent provision of power to the aerosol generation device when the cap is in the open state. In an example embodiment, a third embodiment may be defined in which the case may include a position sensor (e.g., position detection circuitry) disposed at the housing, and the position sensor may be configured to detect the open state and the closed state to open charging contacts between the power module and the aerosol generation device in response to the cap being in the open state. The third embodiment may be combined with any or all of embodiments one and two. In some examples, a fourth embodiment may be defined in which the cap may be operably coupled to the housing via a cap positioning assembly. The fourth embodiment may be combined with any or all of embodiments one to three. In an example embodiment, a fifth embodiment may be defined in which the cap positioning assembly may include a guide slot formed in the housing, guide bar configured to be slidably retained in the guide slot to enable movement of the cap toward and away from the housing, and a hinge operably coupling the cap to the guide bar. The cap may be configured to rotate about the hinge about 90 degrees to expose the mouthpiece for operation of the aerosol generation device. The fifth embodiment may be combined with any or all of embodiments one to four. In some examples, a sixth embodiment may be defined in which the housing may further include a charge port via which the power module is rechargeable from an external power source. The sixth embodiment may be combined with any or all of embodiments one to five. In an example embodiment, a seventh embodiment may be defined in which the aerosol generation device may be completely enclosed inside the case when the cap is in the closed state. The seventh embodiment may be combined with any or all of embodiments one to six. In some examples, an eighth embodiment may be defined in which at least one of the housing and the cap (and sometimes both) may include a receptacle defined by a recessed portion formed in an external surface of the housing or cap, respectively, and a selected one of a plurality of inserts may be insertable into the receptacle by the user. The eighth embodiment may be combined with any or all of embodiments one to seven. In an example embodiment, a ninth embodiment may be defined in which the plurality of inserts may include different colors, patterns, logos, or textures to define respective different aesthetic changes for the case. The ninth embodiment may be combined with any or all of embodiments one to eight. In an example embodiment, a tenth embodiment may be defined in which the power module may be configured to enable provision of power to the aerosol generation device when the cap is in the closed state, and prevent provision of power to the aerosol generation device when the cap is in the open state. The tenth embodiment may be combined with any or all of embodiments one to nine. In some examples, an eleventh embodiment may be defined in which the case may further include an attachment clip operably coupled to the housing. The attachment clip may be rotatable relative to the housing to user selectable positions between a first position in which the attachment clip is substantially aligned with a longitudinal centerline of the case, and a second position in which the attachment clip is substantially perpendicular to the longitudinal centerline of the case. The eleventh embodiment may be combined with any or all of embodiments one to ten.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A case for an aerosol generation device, the case comprising:
   a housing comprising a sleeve portion configured to engage a portion of the aerosol generation device to retain the portion of the aerosol generation device in the housing;
   a power module disposed in the housing and configured to directly or indirectly provide power to the aerosol generation device;
   a cap operably coupled to the housing to cover a mouthpiece of the aerosol generation device in a closed state and enable access to the mouthpiece in an open state; and
   an opening that enables air to enter into the sleeve portion and to exit through the mouthpiece.

2. The case of claim 1, wherein the power module is configured to enable provision of power to the aerosol generation device when the cap is in the closed state, and prevent provision of power to the aerosol generation device when the cap is in the open state.

3. The case of claim 2, wherein the case comprises position detection circuitry disposed at the housing, and
   wherein the position detection circuitry is configured to detect the open state and the closed state to open charging contacts between the power module and the aerosol generation device in response to the cap being in the open state.

4. The case of claim 2, wherein the cap is operably coupled to the housing via a cap positioning assembly.

5. The case of claim 1, wherein the housing further comprises a charge port via which the power module is rechargeable from an external power source.

6. The case of claim 1, wherein the aerosol generation device is completely enclosed inside the case when the cap is in the closed state.

7. A case for an aerosol generation device, the case comprising:
   a housing comprising a sleeve portion configured to engage a portion of the aerosol generation device to retain the portion of the aerosol generation device in the housing;
   a power module disposed in the housing and configured to directly or indirectly provide power to the aerosol generation device; and
   a cap operably coupled to the housing to cover a mouthpiece of the aerosol generation device in a closed state and enable access to the mouthpiece in an open state,
   wherein the cap is operably coupled to the housing via a cap positioning assembly,
   wherein the cap positioning assembly comprises a guide slot formed in the housing, guide bar configured to be slidably retained in the guide slot to enable movement of the cap toward and away from the housing, and a hinge operably coupling the cap to the guide bar, and
   wherein the cap is configured to rotate about the hinge to expose the mouthpiece for operation of the aerosol generation device.

8. A case for an aerosol generation device, the case comprising:
   a housing comprising a sleeve portion configured to engage a portion of the aerosol generation device to retain the portion of the aerosol generation device in the housing;
   a power module disposed in the housing and configured to directly or indirectly provide power to the aerosol generation device; and
   a cap operably coupled to the housing to cover a mouthpiece of the aerosol generation device in a closed state and enable access to the mouthpiece in an open state,
   wherein at least one of the housing and the cap comprises a receptacle defined by a recessed portion formed in an external surface of the housing or cap, respectively, and
   wherein a selected one of a plurality of inserts is insertable into the receptacle by the user.

9. The case of claim 8, wherein the plurality of inserts include different colors, patterns, logos, textures or combinations thereof to define respective different aesthetic changes for the case.

10. A case for an aerosol generation device, the case comprising:
    a housing comprising a sleeve portion configured to engage a portion of the aerosol generation device to retain the portion of the aerosol generation device in the housing;
    a power module disposed in the housing and configured to directly or indirectly provide power to the aerosol generation device; and
    a cap operably coupled to the housing to cover a mouthpiece of the aerosol generation device in a closed state and enable access to the mouthpiece in an open state,
    wherein the housing and the cap each comprises a receptacle defined by a recessed portion formed in an external surface of the housing and the cap, respectively, and
    wherein a selected one of a plurality of inserts is insertable into the receptacle by the user.

11. The case of claim 10, wherein the power module is configured to enable provision of power to the aerosol generation device when the cap is in the closed state, and prevent provision of power to the aerosol generation device when the cap is in the open state.

12. A case for an aerosol generation device, the case comprising:
- a housing comprising a sleeve portion configured to engage a portion of the aerosol generation device to retain the portion of the aerosol generation device in the housing;
- a power module disposed in the housing and configured to directly or indirectly provide power to the aerosol generation device; and
- a cap operably coupled to the housing to cover a mouthpiece of the aerosol generation device in a closed state and enable access to the mouthpiece in an open state,
- wherein the case further comprises an attachment clip operably coupled to the housing,
- wherein the attachment clip is rotatable relative to the housing to user selectable positions between a first position in which the attachment clip is substantially aligned with a longitudinal centerline of the case, and a second position in which the attachment clip is substantially perpendicular to the longitudinal centerline of the case.

13. A reconfigurable case for an aerosol generation device, the case comprising:
- a housing; and
- a sleeve portion formed in the housing and configured to engage a portion of the aerosol generation device to retain the portion of the aerosol generation device in the housing,
- wherein the housing is configured to be reconfigurable to alter an aesthetic appearance of the reconfigurable case or functionality of the aerosol generation device responsive to operably coupling the reconfigurable case to the aerosol generation device,
- wherein the housing and the cap each comprises a receptacle defined by a recessed portion formed in an external surface of the housing and the cap, respectively, and
- wherein a selected one of a plurality of inserts is insertable into the receptacle by the user to alter the aesthetic appearance of the reconfigurable case.

14. The reconfigurable case of claim 13, wherein the housing is configured to alter both the aesthetic appearance of the reconfigurable case and the functionality of the aerosol generation device.

15. The reconfigurable case of claim 13, wherein the housing comprises a power module configured to directly or indirectly provide power to the aerosol generation device; and
- a cap operably coupled to the housing to cover a mouthpiece of the aerosol generation device in a closed state and enable access to the mouthpiece in an open state.

16. The reconfigurable case of claim 15, wherein the power module is configured to enable provision of power to the aerosol generation device when the cap is in the closed state, and prevent provision of power to the aerosol generation device when the cap is in the open state.

17. The reconfigurable case of claim 15, wherein the aerosol generation device is completely enclosed inside the reconfigurable case when the cap is in the closed state.

18. The reconfigurable case of claim 13, wherein the plurality of inserts include different colors, patterns, logos, textures or combinations thereof to define respective different aesthetic changes for the reconfigurable case.

19. A reconfigurable case for an aerosol generation device, the case comprising:
- a housing; and
- a sleeve portion formed in the housing and configured to engage a portion of the aerosol generation device to retain the portion of the aerosol generation device in the housing,
- wherein the housing is configured to be reconfigurable to alter an aesthetic appearance of the reconfigurable case or functionality of the aerosol generation device responsive to operably coupling the reconfigurable case to the aerosol generation device,
- wherein the reconfigurable case further comprises an attachment clip operably coupled to the housing,
- wherein the attachment clip is rotatable relative to the housing to user selectable positions between a first position in which the attachment clip is substantially aligned with a longitudinal centerline of the reconfigurable case, and a second position in which the attachment clip is substantially perpendicular to the longitudinal centerline of the reconfigurable case.

* * * * *